United States Patent [19]

Takanashi et al.

[11] Patent Number: 4,555,714
[45] Date of Patent: Nov. 26, 1985

[54] APPARATUS AND METHOD FOR THERMAL INK TRANSFER PRINTING

[75] Inventors: Itsuo Takanashi; Hideshi Tanaka; Terumi Ohara, all of Yokohama; Toshinori Takahashi, Kawasaki; Shigeru Kato, Tokyo; Tsutomu Kiuchi, Yokohama; Hiroki Kitamura, Tokyo, all of Japan

[73] Assignee: Victor Company of Japan, Ltd., Japan

[21] Appl. No.: 669,783

[22] Filed: Nov. 9, 1984

[30] Foreign Application Priority Data

Nov. 12, 1983 [JP] Japan ................................. 58-211716

[51] Int. Cl.[4] .............................................. B41J 3/20
[52] U.S. Cl. ................................. 346/76 PH; 346/1.1; 219/216
[58] Field of Search .................. 346/76 PH, 76 R, 1.1, 346/139 C; 400/120; 219/216, 543; 250/317.1, 318; 358/296, 298

[56] References Cited

U.S. PATENT DOCUMENTS 3,953,708  4/1976  Thornburg ........................ 219/543
4,413,170 11/1983  Val et al. ............................ 219/216

FOREIGN PATENT DOCUMENTS 0212970 12/1983  Japan .............................. 346/76 PH Primary Examiner—E. A. Goldberg
Assistant Examiner—A. Evans
Attorney, Agent, or Firm—Lowe, King, Price & Becker

[57] ABSTRACT

A plurality of heat generating resistors (11a, 11b) arranged in line in a thermal head are driven such that two consecutive heat generating resistors (11a, 11b) are combined to cover a single picture element whose desired density is represented by each datum. A head drive circuit is provided so that only a first heat generating resistor (11a) is energized when the desired density is below a predetermined value, and that both the first and second heat generating resistors (11a, 11b) are energized when the desired density is equal to or above the predetermined value. The energizing duration of the second heat generating resistor (11b) is set to be within the energizing duration of the first heat generating resistor (11a) to reduce printing time, and the end of the energizing duration of the second heat generating resistor (11b) corresponds to the end of energizing duration of the first heat generating resistor (11a) so as to ensure linearity in tone value.

2 Claims, 5 Drawing Figures

APPARATUS AND METHOD FOR THERMAL INK TRANSFER PRINTING

BACKGROUND OF THE INVENTION

This invention relates generally to thermal ink transfer printing apparatus, and particularly to such apparatus which is capable of selecting a desired tone value for each picture element.

Thermal ink transfer printing, whose principle is shown in FIG. 1, is arranged such that a print sheet 1 and an ink transfer sheet contacting each other are sent to a portion between a platen roller 3 and a thermal head 4, and when the ink transfer sheet 2 is heated with respective heat generating resistors of the thermal head 4 being operated to generate heat by applying currents to the respective heat generating resistors, thermally fusable ink 2' painted on the ink transfer sheet 2 at a constant thickness is molten to be transferred to the print sheet 1, and then the print sheet to which ink transfer printing has been effected is cut to have a suitable shape so as to be a printed matter, while the ink transfer sheet which has become unnecessary is taken up by a take up roller via a guide roller so as to be disposed.

Printing with a desired tone value, which will be simply referred to as tone value printing hereinafter, in such thermal ink transfer printing is effected such that a given area of ink on the ink transfer sheet is molten by way of a heat generating resistor so as to obtain a given density, namely, area control is effected such that when density is low, the area to be molten is small and when density is high, the area to be molten is large.

If the area of each heat generating resistor is made small so as to obtain a fine printing result, since maximum area cannot be made large on tone value printing, accurate density indication cannot be performed because white-omission occurs when it is required to perform uniformly-density printing over a relatively large area. When power is made large so as to obtain a density or tone value similar to uniform-density printing, then there is a drawback that the heat generating resistor burns out. Furthermore, there is a problem that linear printing cannot be performed since the input signal and temperature rise are not in linear relationship.

On the contrary to the above, when the area of each heat generating resistor is made large, a minimum area is necessarily made large resulting in coarse printing.

SUMMARY OF THE INVENTION

The present invention has been developed in order to remove the above-described drawbacks inherent to the conventional thermal ink transfer printing apparatus.

It is, therefore, an object of the present invention to provide new and useful apparatus and method for thermal ink transfer printing so that tone value setting is readily effected while printing time is reduced.

According to a feature of the present invention at least two consecutive heat generating resistors in an array of the same are used such that one or both of the two heat generating resistors are/is energized depending on a desired density of a pixel of an image to be printed by a thermal ink transfer printing apparatus where the end timing of energizing duration of the two heat generating resistors is made equal to each other.

In accordance with the present invention there is provided an apparatus for thermal ink transfer printing, comprising: a thermal head having a plurality of heat generating resistors arranged in line for melting thermally fusable ink attached to an ink sheet, first and second groups of heat generating resistors respectively corresponding to two alternate arrangements of the heat generating resistors being arranged so that each of the second group is positioned within a pre-heating region of the first group; a head driving circuit responsive to an input signal for energizing the heat generating resistors such that each datum representing a desired density of a pixel is used to energize first and/or second heat generating resistors positioned close to each other, the first heat generating resistor being of the first group and the second heat generating resistor being of the second group, the head driving circuit having; first means responsive to the input signal for detecting the desired density; second means for energizing only the first heat generating resistor when the desired density is samller than a predetermined value, the second means energizing the first heat generating resistor for a duration determined by the desired density; and third means for energizing both the first and second heat generating resistors when the desired density is equal to or greater than the predetermined value, the third means energizing the first heat generating resistor for a predetermined maxium duration and the second heat generating resistor, for a duration determined by the desired density, in such a manner that an end of the energizing duration of the second heat generating resistor corresponds to an end of the energizing duration of the first heat generating resistor.

In accordance with the present invention there also is provided a method of thermal ink transfer printing using a thermal head having a plurality of heat generating resistors arranged in line for melting thermally fusable ink attached to an ink sheet, comprising the steps of: decoding an input signal for detecting a desired density of each pixel which is formed by first and second heat generating resistors arranged close to each other; energizing only the first heat generating resistor when the desired density is samller than a predetermined value, for a duration determined by the desired density; and energizing both the first and second heat generating resistors when the desired density is equal to or greater than the predetermined value, the first heat generating resistor being energized for a predetermined maxium duration and the second heat generating resistor being energized for a duration determined by the desired density in such a manner that an end of the energizing duration of the second heat generating resistor corresponds to an end of the energizing duration of the first heat generating resistor.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 2:
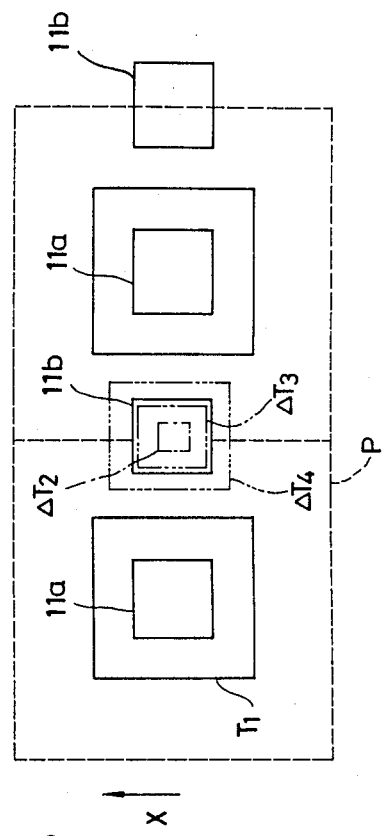
FIG. 2 is a schematic view of a part of a thermal head used in printing apparatus according to the present invention.

Referring now to FIG. 2 of the drawings, a schematic view of a part of a thermal head used in the present invention is shown. As is well known in the art, a thermal head used for thermal ink transfer printing apparatus comprises a plurality of heat generating resistors arranged in line or matrix. Although each heat generating resistor is used for each pixel (picture element) signal in conventional apparatus, two or more heat generating resistors are used for a single pixel signal in the present invention. In other words, each pixel signal is used to drive one or both of the two heat generating resistors in the case two heat generating resistors are provided for each pixel. A plurality of heat generating resistors arranged in line in a thermal head are divided into two sets or groups each including alternate heat generating resistors. These sets are referred to as first and second sets, and heat generating resistors belonging to the first or second set are referred to as first or second heat generating resistors. The thermally fusable ink painted on the ink transfer sheet at a given thickness is molten for a given area so as to obtain a given density of a pixel signal by way of two heat generating resistors which are adjacent to each other thereby performing thermal ink transfer printing. In the case that the density is below or equal to half the maximum density, only one heat generating resistor of the first set is energized, and the other heat generating resistor of the second set is not energized, while the energizing duration is controlled in accordance with density. In the case that the density is equal to or greater than the maximum density, the energizing duration of one heat generating resistor is set to a constant maximum value, while the energizing duration of the remaining heat generating resistor is controlled in accordance with the density. This energizing duration is set to be within the above-mentioned constant maximum energizing duration, and the ending time of energization of the two heat generating resistors for instance is made equal to each other.

An embodiment will be described taking a case that two heat generating resistors are used for a single pixel for effecting tone value thermal ink transfer printing.

Figure 1:
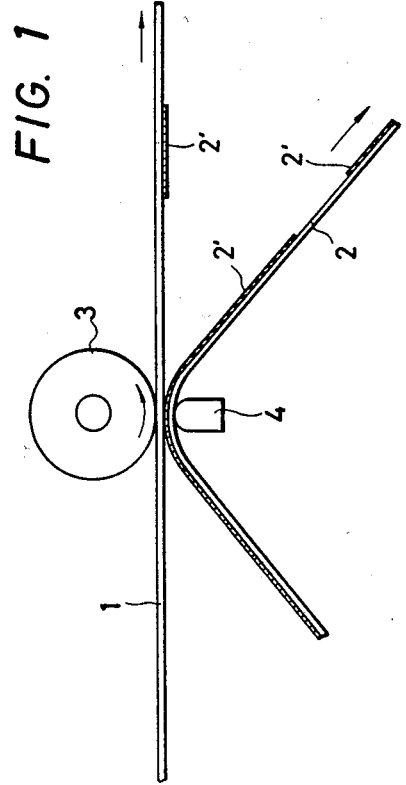
FIG. 1 is a schematic plan view of a thermal ink transfer printing apparatus to which the present invention is adapted.

FIG. 2 is an explanatory diagram of heat generating resistors corresponding to two pixels, which are built in a thermal head of a tone value thermal ink transfer printing apparatus shown in FIG. 1. The thermal head 4 comprises a plurality of heat generating resistors 11a, 11b, arranged line and only four of them are shown in FIG. 2 for simplicity. The direction of the allignment of the heat generating resistors 11a, 11b is substantially normal to a direction of the relative movement between the thermal head 4 and the print sheet 1. The relative motion of the print sheet 1 is shown by an arrow X in FIG. 2.

Figure 3:
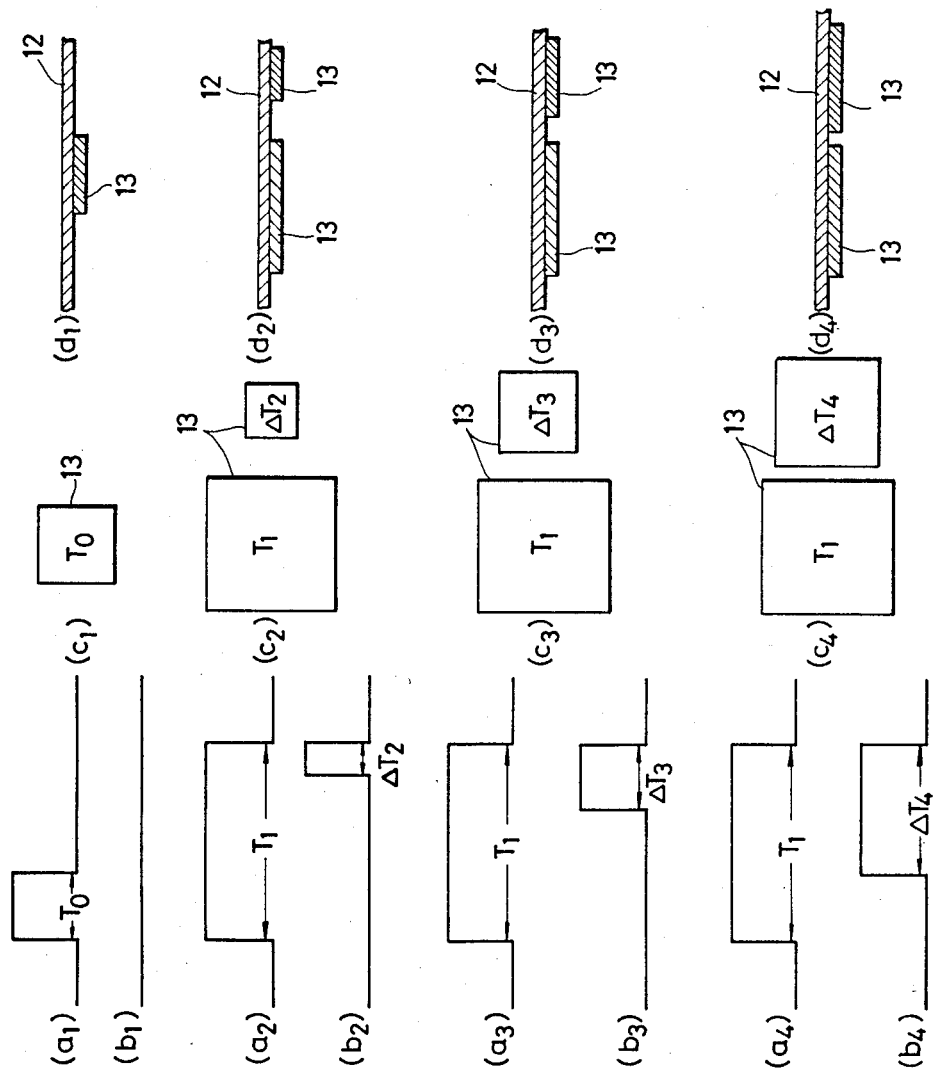
FIG. 3 is an explanatory diagram for the description of the embodiment of the present invention.

FIG. 3 is an explanatory diagram showing the relationship between energizing durations of the two heat generating resistors shown in FIG. 2, and the result of printing. In detail, the references a1 to a4 and b1 to b4 show heating durations and the references c1 to c4 show ink-melting areas on the ink transfer sheet 13 caused by the heat. Furthermore, the references d1 to d4 show cross-sectional views showing the state of fused ink attached to the print sheet 12.

Turning back to FIG. 2, heat generating resistors indicated at the reference 11a are of the first set, while other heat generating resistors indicated at the reference 11b are of the second set. The first set and second set heat generating resistors 11a and 11b are respectively arranged alternately. One of the two heat generating resistors 11a of the first set, which is show at the left, is referred to as a first heat generating resistor, and the heat generating resistor 11b positioned at the right of the first heat generatign resitor 11a is referred to as a second heat generating resistor for simplicity.

These first and second heat generating resistors 11a and 11b are used to form a combination so that density data or signal corresponding to a single pixel is used for this combination of the two heat generating resistors 11a and 11b. In other words, a tone value of a single pixel is determined by one or both of the first and second heat generating resistors 11a and 11b as will be described in detail hereinafter. When a desired tone value or density of the corresponding pixel is below half the maximum density thereof, then only the heat generating resistor 11a is energized such that its energizing duration is controlled so that the density linearly changes. When a desired tone value or density equals or exceeds the half of the maximum density, then both the first and second heat generating resistors 11a and 11b are energized. The first and second heat generating resistors 11a and 11b are arranged such that the interval or pitch therebetween is made one half the interval between pixels. The second heat generating resistor 11b is located so that it resides in a pre-heating region P of the heat generating resistors 11a of the first set. The pre-heating region P is a place where the heat generated by the heat generating resistors 11a is transmitted to ink of the ink transfer sheet so that the ink will readily melt when the temperature is further raised. However, the ink corresponding to the pre-heating region P is not molten by only the heat from the first heat generating resistor 11a.

In FIG. 2, a region T1 enclosed by a solid line which is outside the heat generating resistor 11a indicates a melting region of the thermally fusable ink on energization of the first heat generating resistor 11a for a maxium energizing duration $T_1$, while regions $\Delta T_2$, $\Delta T_3$, $\Delta T_4$ enclosed by one-dot-dash line to three-dot-dash line at the heating resistor 11b indicate melting regions of the thermally fusable ink on energization of the heat generating resistor 11b for durations $\Delta T_2$, $\Delta T_3$, $\Delta T_4$.

When currents fed to the first and second heat generating resistors 11a and 11b are controlled as shown in the waveforms a1 to a4 and b1 to b4 of FIG. 3, the area of the thermally fusable ink 13 to be molten and transferred to the print sheet 12 becomes as shown in c1 to c4 and d1 to d4 of FIG. 3.

More specifically, in the case that the area of thermally fusable ink to be transferred is equal to or smaller than the area corresponding to half of the maximum density, only the heat generating resistor 11a is energized for a duration $T_0 (T_0 \leq T_1)$ in accordance with the above-mentioned density as shown in FIG. 3 a1 and b1, while the heat generating resistor 11b is not energized at all. As a result of such arrangement, transfer occurs within a region $T_0$ which is smaller than the region $T_1$ enclosed by a solid line at the heat generating resistor 11a of FIG. 2, by way of only the heat generating resistor 11a as shown in c1 and d1 of the same diagram.

In the case that the area of thermally fusable ink to be transferred exceeds half the maximun density, the first heat generating resistor 11a is energized for a period (maximum period) $T_1$ corresponding to half the maximum density, while the second heat generating resistor 11b is also energized for a period corresponding to the density of the pixel, namely for $\Delta T_2$, $\Delta T_3$, or $\Delta T_4$.

This duration for which the second heat generating resistor 11b is energized is be within T1 for which the first heat generating resistor 11a is energized, and the end timing of energization of the heat generating resistors 11a and 11b are the same as shown in the waveforms a2, b2, a3, b3 and a4, b4 of FIG. 3.

Therefore, as shown at c2, d2, c3, d3, c4, d4 in FIG. 3, transfer corresponding to the region $T_1$ enclosed by solid line at the heat generating resistor 11a of FIG. 2 is effected by the first heat generating resistor 11a, while transfer corresponding to the regions $\Delta T_2$, $\Delta T_3$, $\Delta T_4$ enclosed by dotted line at the heat generating resistor 11b of FIG. 2 is effected by the second heat generating resistor 11b.

Figure 4:
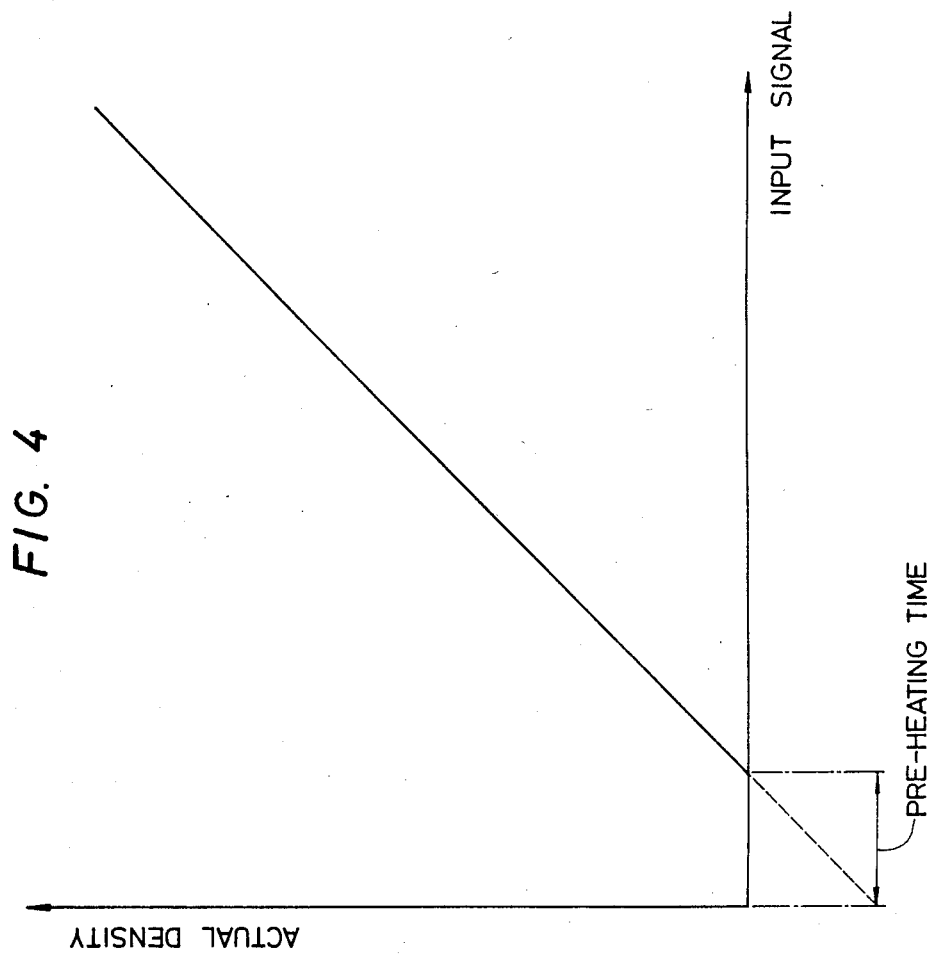
FIG. 4 is a graph showing the characteristic of the thermal head used in the present invention.

As described in the above, since the second heat generating resistor 11b is located within the pre-heating region P, the thermally fusable ink on the ink transfer sheet which is to be molten by the second heat generating resistor 11b is ready to be molten at the time of energization of the second heat generating resistor 11b. Therefore, the ink at this portion redily melts when the second heat generating resistor 11b is energized. The energizing duration of the second heat generating resistor 11 for obtaining a desired density can be readily calculated in advance since pre-heating time, i.e. $T_1-\Delta T_2$, $T_1-\Delta 3$ or $T_1-\Delta T_4$, is known and melting characteristic of the ink is also known. From the above, it will be understood that since the end timing of energizing durations of the first and second heat generating resistors 11a and 11b are made equal to each other as shown in the waveforms a2, b2, a3, b3, a4, b4 of FIG. 3, the energizing duration $\Delta T_2$, $\Delta T_3$ and $\Delta T_4$ can be accurately determined in advance considering the pre-heating time so that accurate tone value control is achieved. More specifically, tone value or density of each pixel exhibited on a print sheet is substantially proportional to the tone value or density represented by the input signal or data as seen in FIG. 4. In other words, superior linearity is ensured.

Although is has been described that two heat generating resistors are used for a single pixel signal in the above embodiment, the number of heat generating resistors may be increased as 3, 4 . . . for a single pixel signal. For instance, when three heat generating resistors are provided for a single pixel signal or datum, then only one of the three heat generating resistors may be energized when a desired density is below $\frac{1}{3}$ the maximum density, and remaiging one or two heat generating resistors may be energized as the density increaes.

Figure 5:
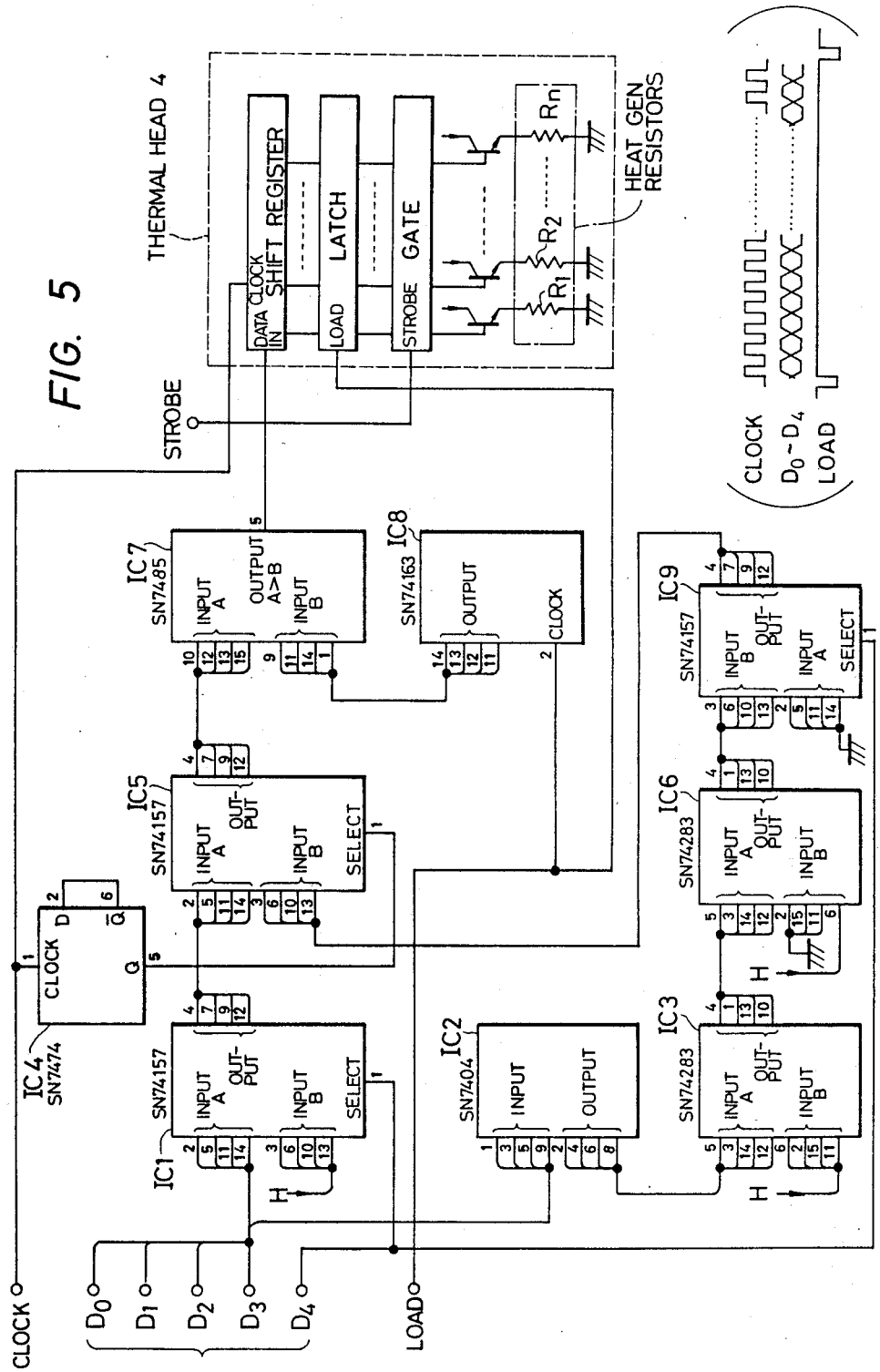
FIG. 5 is a circuit diagram of a head driving circuit used in the embodiment of the present invention.

The present invention will be further described with reference to FIG. 5 showing a thermal head driving circuit used for the thermal ink transfer printer according to the present invention. The head drive circuit comprises nine integral circuits IC1 to IC9, and data input terminals D0 to D4. In addition some other input terminals CLOCK, LOAD and STROBE are provided for receiving such labeled signals. The input data fed to the data input terminals D0 to D4 is a digital signal indicative of a desired tone value of each pixel. The integrated circuits IC1, IC5 and IC9 are selectors which select one of two input data fed to first and second sets of input terminals A and B respectively in accordance with a signal fed to its SELECT terminal. IC4 is a frequency divider for dividing the frequency of clock pulses. IC2 is an inverter. IC3 and IC6 form a substractor. IC 7 is a digital comparator, and IC8 is a counter for counting the number of LOAD pulses. Preferable types of these ICs are labelled in FIG. 5.

An output signal from the IC7 is fed to a shift register of the thermal head having a latch circuit and a gate circuit as well as an array of heat generating resistors R1, R2 . . . Rn and associated switching transistors. The latch circuit is controlled by the LOAD signal, while the gate circuit is controlled by the STROBE signal. Shifting in the shift register is effected in response to clock pulses.

Tone value data fed to input terminals D0 to D4 is fed such that lower four bits fed to terminals D0 to D3 are fed to a first set of input terminals A of the IC1 whose other or second set of input terminals B receive high level signals expressed in terms of H. The MSB fed to the terminal D4 is fed to the SELECT terminal of the IC1 so that high level signals H are outputted when MSB is of high level, and tone value data fed to D0 to D1 is outputted when the MSB is of low level. Hereinbelow, references H and L are used to indicate high and low levels respectively, and the reference D0 to D4 representing the input terminals are also used to designate the signals or data fed to these terminals. The output data from the IC1 is fed to a first set of input terminals A of the IC5. The tone value data D0 to D3 is fed to the IC2 to be inverted therein so that inverted tone value data D0 to D3 is fed to a first set of input terminals A of the IC3 whose second set of input terminals B receive H signals. As a result, the input data fed to the first set of input terminals A is added to the high level data fed to the second set of input terminals B to produce output data indicative of the sum obtained as the result of addition. The sum data is fed from the output of the IC3 to a first set of input terminals A of the IC6 whose second set of input terminals B receive an H signal at only LSB terminal, remaining terminals of the second set B being grounded. The data fed to the first set of input terminals A is added to the data fed to second set of input terminals B so that a difference between a maximum four bit value and the data represented by D0 to D3 is produced and fed from the IC6 to a set of input terminals B of the IC9. The IC9 is responsive to MSB (D4) for selecting the data fed to terminals B or the other data fed to the other set of terminals A all grounded to receive L signals. When D4 is L, L signls are outputted from the IC9. On the other hand, when D4 is H, the difference data from the IC6 is outputted.

The IC4 responsive to a clock train divides the frequency of the clock pulses by two, and a frequency-divided clock pulses are fed to SELECT terminal of the IC5. The first set of input terminals A of the IC5 receives the output data from the IC1, i.e. D0 to D3 when D4 is L, and H signals when D4 is H, while the second set of input terminals B receive L signals when D4 is L, and the difference data when D4 is H. These two data respectively fed to first and second sets of input terminals A and B are alternately fed to the IC7 in response to the pulses fed to SELECT terminal of the IC5. The data fed to a first set of input terminals A of the IC7 is compared with data at the second set of input temrinals B, and output data from the IC7 is fed to the shift register so as to drive the thermal head. The IC8 is responsive to the LOAD pulses so as to count up the number of the same in sequence till one half the maximum tone value, and the count is fed to the second set of input terminals B of the IC7. The LOAD pulse, which is used by the latch of the thermal head, appears each time the number of clock pulses reaches the total number of heat generating resistors R1, R2 . . . Rn. With this arrangement, when given data is fed to the shift register from the IC7, then data of the shift register is latched in response to the LOAD pulse, and then switching transistors are controlled when STROBE pulse is H so as to energize associated heat generating resistors R1, R2 . . . Rn such that first and second heat generating resistors, such as R1 and R2 corresponding 11a and 11b respectively of FIG. 2, are controlled to obtain a desired tone value as described with reference to FIG. 2.

In the case of using two heat generating resistors for instance, it takes only half time of the duration required in conventional technique to print a maximum density portion. In the case of using three heat generating resistors, it takes only ⅓ of the duration required in conventional technique to print a maximum density portion. In this way printing time can be drastically reduced.

In addition, as shown in FIG. 4, since the input signal which is density data of a pixel, has a linear relationship with respect to the actual printing density, and therefore, tone value printing can be effected with superior linearlity.

Moreover, since a plurality of heat generating resistors are used for a single pixel signal, it is possible to form a small dot as well as a large dot, and printing region of density is wide.

What is claimed is:

1. Apparatus for thermal ink transfer printing, comprising:
    (a) a thermal head having a plurality of heat generating resistors arranged in line for melting thermally fusable ink attached to an ink sheet, first and second groups of heat generating resistors respectively corresponding to two alternate arrangements of said heat generating resistors being arranged so that each of said second group is positioned within a pre-heating region of said first group;
    (b) a head driving circuit responsive to an input signal for energizing said heat generating resistors such that each datum representing a desired density of a pixel is used to energize first and/or second heat generating resistors positioned close to each other, said first heat generating resistor being of said first group and said second heat generating resistor being of said second group, said head driving circuit having;
    first means responsive to said input signal for detecting said desired density;
    second means for energizing only said first heat generating resistor when said desired density is smaller than a predetermined value, said second means energizing said first heat generating resistor for a duration determined by said desired density; and
    third means for energizing both said first and second heat generating resistors when said desired density is equal to or greater than said predetermined value, said third means energizing said first heat generating resistor for a predetermined maxium duration and said second heat generating resistor, for a duration determined by said desired density, in such a manner that an end of the energizing duration of said second heat generating resistor corresponds to an end of the energizing duration of said first heat generating resistor.

2. A method of thermal ink transfer printing using a thermal head having a plurality of heat generating resistors arranged in line for melting thermally fusable ink attached to an ink sheet, comprising the steps of:
    (a) decoding an input signal for detecting a desired density of each pixel which is formed by first and second heat generating resistors arranged close to each other;
    (b) energizing only said first heat generating resistor when said desired density is smaller than a predetermined value, for a duration determined by said desired density; and
    (c) energizing both said first and second heat generating resistors when said desired density is equal to or greater than said predetermined value, said first heat generating resistor being energized for a predetermined maxium duration and said second heat generating resistor being energized for a duration determined by said desired density in such a manner that an end of the energizing duration of said second heat generating resistor corresponds to an end of the energizing duration of said first heat generating resistor.

* * * * *